R. VERBEKE.
TRACK FOR CASTERS, &c.
APPLICATION FILED APR. 12, 1913.
1,065,989.
Patented July 1, 1913.
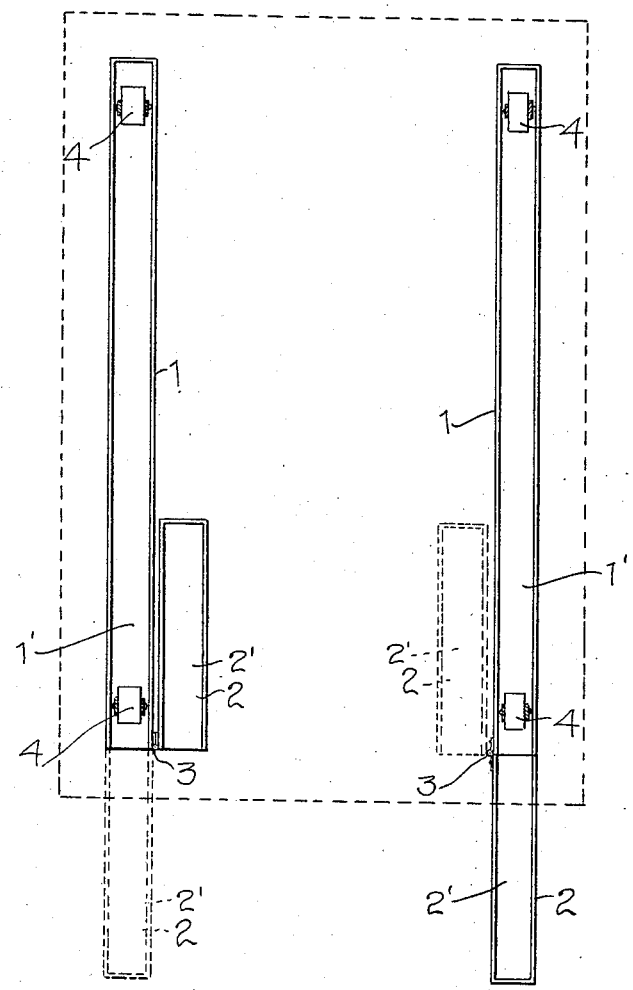
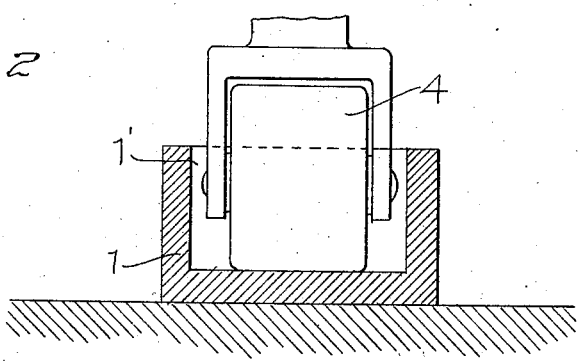
Witnesses
Robert M. Sutphen.
A. I. Hind.
Inventor
RICHARD VERBEKE
By Watson E. Coleman
Attorney

UNITED STATES PATENT OFFICE.

RICHARD VERBEKE, OF TRYON, NORTH CAROLINA.

TRACK FOR CASTERS, &c.

1,065,989.  Specification of Letters Patent.  Patented July 1, 1913.

Application filed April 12, 1913. Serial No. 760,843.

*To all whom it may concern:*

Be it known that I, RICHARD VERBEKE, a subject of the King of Belgium, residing at Tryon, in the county of Polk and State of North Carolina, have invented certain new and useful Improvements in Tracks for Casters, &c., of which the following is a specification, reference being had to the accompanying drawings.

This invention comprehends certain new and useful improvements in tracks for casters of beds, etc., and has for its primary object to provide track members which are adapted to receive the rollers or casters and support the same above the floor or carpet, thereby preventing said rollers or casters from marking or injuring the floor or carpet.

Another object is to provide track members of this character formed in sections, the small sections of which are hinged to the longer sections and adapted at times to be swung to a position beneath the bed or other piece of furniture by which the casters are carried where the said small or short sections will be out of the way.

A further object is to provide track members of this character constructed in such manner that the short sections thereof may be readily swung into alinement with the long sections to which they are connected, thereby making it possible to move the bed or other piece of furniture forwardly or rearwardly upon the track members.

With the above and other objects in view, this invention resides in the novel features of construction, combinations, formations, and arrangements of parts to be hereinafter more fully described, claimed, and illustrated in the accompanying drawings, in which, Figure 1 is a top plan view of my invention in use, the bed being indicated in dotted lines with the lower ends of the legs in section and the casters or rollers in the grooves in the long track members, one of the short track sections being shown in alinement with the long track section to which it is hinged while the other short track section is shown in position beneath the bed and parallel with the long section to which it is hinged, reverse positions of the short sections being indicated by dotted lines. Fig. 2 is an enlarged cross-sectional view through one of the track members, said view showing one of the casters in position, the leg of the bed being broken away.

Referring more particularly to the drawings, in which similar reference characters designate corresponding parts throughout the views, the numeral 1 designates the long sections of the track members and 2 the short sections hinged to the long section, as shown at 3, and adapted to be swung against one side of the long sections, as clearly shown in Fig. 1. The track sections 1 and 2 are preferably formed of hard wood, or other suitable material, and have the longitudinal grooves 1′ and 2′, respectively, formed in their upper faces, which grooves stop short of the outer ends of said sections, thereby preventing the rollers or casters 4 from running off of the outer ends of the sections 1 and 2 when said sections are in alinement, as will be clearly apparent.

The rail sections 1 are placed parallel to one another beneath the bed or other piece of furniture, and the rollers or casters 4 of said piece of furniture are placed in the grooves 1′, it being understood that the sections 1 are of the proper length to receive the rollers upon either side of the bed or piece of furniture. The short sections 2 are normally in closed position, as shown in Fig. 1, and parallel with the long sections 1, but beneath the furniture, and therefore out of the way. When it is desired to move the furniture, the short sections 2 are swung upon their hinges 3 until said sections are in open position or in alinement with the long sections 1, at which time the grooves 2′ will form continuations of the grooves 1′, thereby allowing the furniture to be drawn forwardly, the front rollers or casters leaving the grooves 1′ and traveling in the grooves 2′. After the furniture has been returned to normal position, with the front rollers as well as the back rollers or casters resting in the grooves 1′, the short sections 2 may again be swung to their closed positions beneath the furniture and parallel with the long sections 1.

The track sections 1 and 2 are especially desirable for use in connection with beds or other heavy furniture, which must at all times be moved from their resting places for sweeping or other purposes and when moved across the room with their rollers or casters bearing upon the floor or carpet, will invariably mark or cut the same, but when the rollers rest in the grooves 1' and 2' of the sections 1 and 2, this danger of injuring the floor or carpet will be eliminated.

Owing to the extremely simple construction of my improved track members for supporting furniture rollers or casters, it will be evident that said track members may be readily and cheaply manufactured and will be highly efficient and effective in the performance of their duty. It will be understood, however, that if desired, minor changes in the details of construction may be made within the scope of the appended claims without departing from or sacrificing any of the advantages of the invention.

What is claimed is:—

1. A caster supporting member comprising a channel bar having a closed end and an open end, an auxiliary channel bar having a closed end and an open end, means for hingedly connecting the open end of the first channel bar and the auxiliary channel bar whereby said auxiliary channel bar may be swung in alinement with the first channel bar to form a continuation of the same.

2. A track for casters comprising a pair of parallel main channel bars having corresponding closed and open ends and adapted to receive casters therein, a pair of auxiliary channel bars having open and closed ends adapted to be positioned in alinement with the main channel bars to form continuations of the same, and means for hinging the open ends of the auxiliary bars to the open ends of the main channel bars whereby said auxiliary channel bars may be swung to their inoperative positions against the inner sides of the main channel bars.

In testimony whereof I hereunto affix my signature in the presence of two witnesses.

RICHARD VERBEKE.

Witnesses:
 GEO. A. GASH,
 SAMUEL HILL.

Copies of this patent may be obtained for five cents each, by addressing the "Commissioner of Patents, Washington, D. C."